(12) United States Patent
McCormick, Jr.

(10) Patent No.: US 9,092,346 B2
(45) Date of Patent: Jul. 28, 2015

(54) SPECULATIVE CACHE MODIFICATION

(75) Inventor: James E. McCormick, Jr., Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 13/992,354

(22) PCT Filed: Dec. 22, 2011

(86) PCT No.: PCT/US2011/066846
§ 371 (c)(1),
(2), (4) Date: Jun. 7, 2013

(87) PCT Pub. No.: WO2013/095508
PCT Pub. Date: Jun. 27, 2013

(65) Prior Publication Data
US 2013/0254486 A1    Sep. 26, 2013

(51) Int. Cl.
*G06F 9/38* (2006.01)
*G06F 12/08* (2006.01)
*G06F 9/30* (2006.01)

(52) U.S. Cl.
CPC ........ *G06F 12/0875* (2013.01); *G06F 9/30043* (2013.01); *G06F 9/3842* (2013.01); *G06F 12/0855* (2013.01); *G06F 12/0802* (2013.01); *G06F 2212/507* (2013.01); *Y02B 60/1225* (2013.01)

(58) Field of Classification Search
CPC ........................... G06F 9/3004; G06F 12/0855
USPC ................................................ 711/140, 135
See application file for complete search history.

(56) References Cited

U.S. PATENT DOCUMENTS 6,553,473 B1 * 4/2003 Gaskins et al. ............... 711/169
(Continued)

OTHER PUBLICATIONS

PCT International Search Report for PCT Counterpart Application No. PCT/US2011/066846, 3 pgs., (Aug. 30, 2012).

(Continued)

*Primary Examiner* — Than Nguyen
(74) *Attorney, Agent, or Firm* — Nicholson De Vos Webster & Elliott LLP

(57) ABSTRACT

In accordance with embodiments disclosed herein, there are provided methods, systems, mechanisms, techniques, and apparatuses for implementing a speculative cache modification design. For example, in one embodiment, such means may include an integrated circuit having a data bus; a cache communicably interfaced with the data bus; a pipeline communicably interfaced with the data bus, in which the pipeline is to receive a store instruction corresponding to a cache line to be written to cache; caching logic to perform a speculative cache write of the cache line into the cache before the store instruction retires from the pipeline; and cache line validation logic to determine if the cache line written into the cache is valid or invalid, in which the cache line validation logic is to invalidate the cache line speculatively written into the cache when determined invalid and further in which the store instruction is allowed to retire from the pipeline when the cache line is determined to be valid.

25 Claims, 14 Drawing Sheets

(56) References Cited

U.S. PATENT DOCUMENTS

| | | | |
|---|---|---|---|
| 7,383,409 B2 | 6/2008 | Steely, Jr. et al. | |
| 7,594,096 B2 | 9/2009 | Eickemeyer et al. | |
| 2004/0154012 A1* | 8/2004 | Wang et al. | 717/158 |
| 2005/0154866 A1* | 7/2005 | Steely et al. | 712/228 |
| 2007/0288725 A1 | 12/2007 | Luick | |
| 2008/0163008 A1 | 7/2008 | Jacob | |
| 2011/0138126 A1* | 6/2011 | Blundell et al. | 711/125 |

OTHER PUBLICATIONS

PCT Written Opinion of the International Searching Authority for PCT Counterpart Application No. PCT/US2011/066846, 4 pgs., (Aug. 30, 2012).

PCT Notification concerning Transmittal of Copy of International Preliminary Report on Patentability (Chapter I of the Patent Cooperation Treaty) for PCT Counterpart Application No. PCT/US2011/066846, 6 pgs., (Jul. 3, 2014).

\* cited by examiner

1000

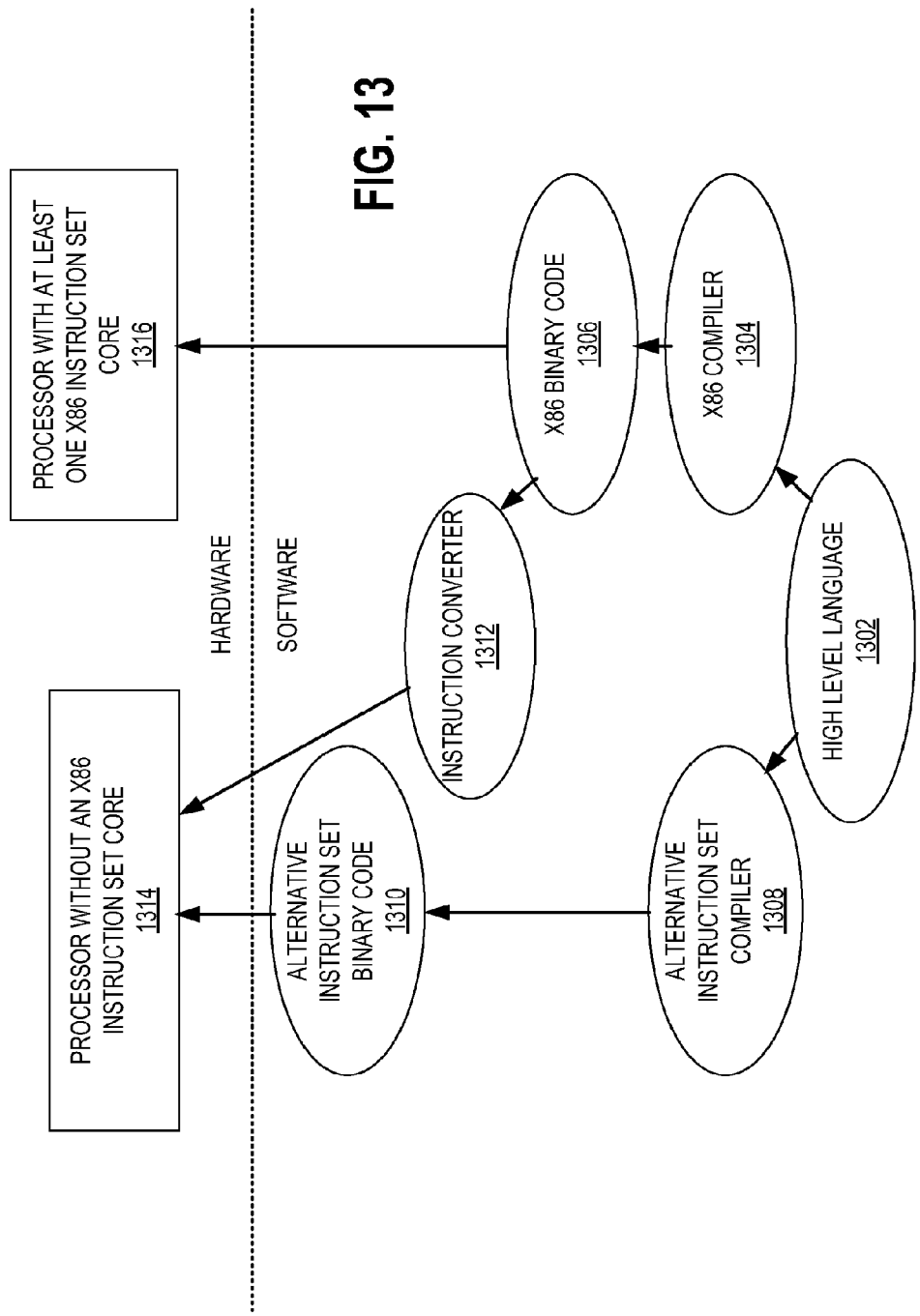

SPECULATIVE CACHE MODIFICATION

CROSS-REFERENCE TO RELATED APPLICATIONS

This patent application is a U.S. National Phase Application under 35 U.S.C. §371 of International Application No. PCT/US2011/066846, filed Dec. 22, 2011, entitled SPECULATIVE CACHE MODIFICATION.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for implementing a speculative cache modification design.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Generally speaking, memory closer to the CPU may be accessed faster. Memory within a CPU may be referred to as cache, and may be accessible at different hierarchical levels, such as Level 1 cache (L1 cache) and Level 2 cache (L2 cache). System memory such as memory modules coupled with a motherboard may also be available, such externally available memory which is separate from the CPU but accessible to the CPU may be referred to as, for example, off-chip cache or Level 3 cache (L3 cache), and so on, however, this is not always consistent as a third hierarchical level of cache (e.g., L3 cache) may be on-chip or "on-die" and thus be internal to the CPU.

CPU cache, such as L1 cache, is used by the central processing unit of a computer to reduce the average time to access memory. The L1 cache is a smaller, faster memory which stores copies of the data from the most frequently used main memory locations. L2 cache may be larger, but slower to access. And additional memory, whether on-chip or externally available system memory used as cache may be larger still, but slower to access then smaller and closer CPU cache levels. As long as most memory accesses are cached memory locations, the average latency of memory accesses will be closer to the cache latency than to the latency of main memory.

When the processor needs to read from or write to a location in main memory, it first checks whether a copy of that data is in one of its caches (e.g., L1, L2 caches, etc.) and when available, the processor reads from or writes to the cache instead of seeking the data from a system's main memory, thus providing a faster result than reading from or writing to main memory of the system.

Conventional caches utilize a store buffer to reduce cache latency and also to enable the reading of store instructions that have not yet been written into cache. As stores go down a pipeline they store the data in a store buffer and persist until the store is retired from the pipeline, at which point the store writes the data to cache.

Improvements to cache latency (e.g., reductions in cache latency) provide direct and immediate benefits to computational efficiency for an implementing circuit. Lower latency means that data required by, for example, a CPU pipeline is available sooner without having to expend cycles waiting for unavailable data.

However, the conventional cache design exhibits undesirable traits. For example, the store buffer necessitates additional circuit complexity and additional components on an integrated circuit that implements such circuitry. The store buffer requires the allocation of valuable area for address comparators, data buffering space, muxes (multiplexors) and so forth on an integrating circuit and further consumes power to operate such devices. Moreover, when data is directed to the store buffer, several cycles may be required before a subsequent cache read operation is able to "see" and retrieve the data from the store buffer; and still further additional cycles are required before the data can be retrieved from the cache. Thus, if an instruction to store "x" in the cache is triggered and an instruction to read "x" from the cache is issued within shortly thereafter, the read must be stalled or replayed in the pipeline for multiple cycles until data "x" becomes available in the store buffer, thus introducing overhead inefficiencies and sub-optimal system performance.

The present state of the art may therefore benefit from systems and methods for implementing a speculative cache modification design as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 13 illustrates a system to translate instructions according to one embodiment.

DETAILED DESCRIPTION

Figure 1A:
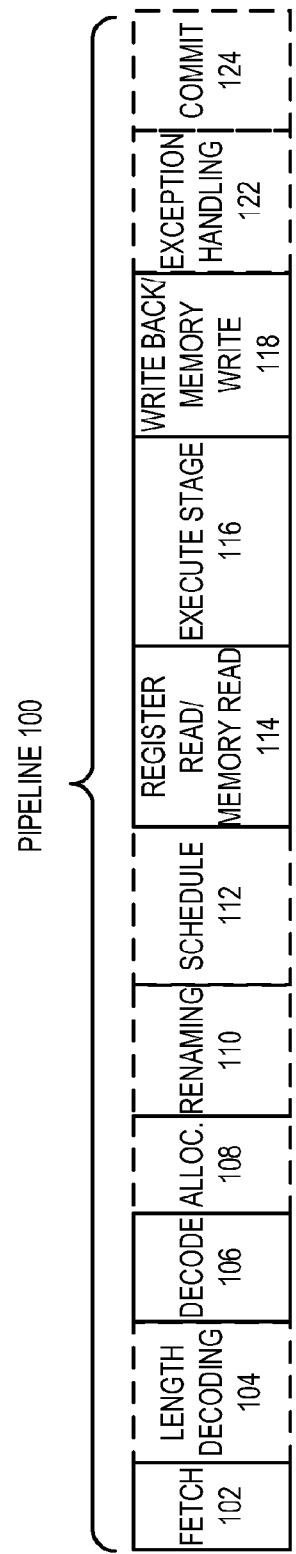
FIG. 1A is a block diagram illustrating both an exemplary in-order pipeline and an exemplary register renaming, out-of-order issue/execution pipeline according to described embodiments.

Described herein are systems and methods for implementing a speculative cache modification design. For example, in one embodiment, such means may include an integrated circuit having a data bus; a cache communicably interfaced with the data bus; a pipeline communicably interfaced with the data bus, in which the pipeline is to receive a store instruction corresponding to a cache line to be written to cache; caching logic to perform a speculative cache write of the cache line into the cache before the store instruction retires from the pipeline; and cache line validation logic to determine if the cache line written into the cache is valid or invalid, in which the cache line validation logic is to invalidate the cache line speculatively written into the cache when determined invalid and further in which the store instruction is allowed to retire from the pipeline when the cache line is determined to be valid.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

Exemplary Core Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 1B:
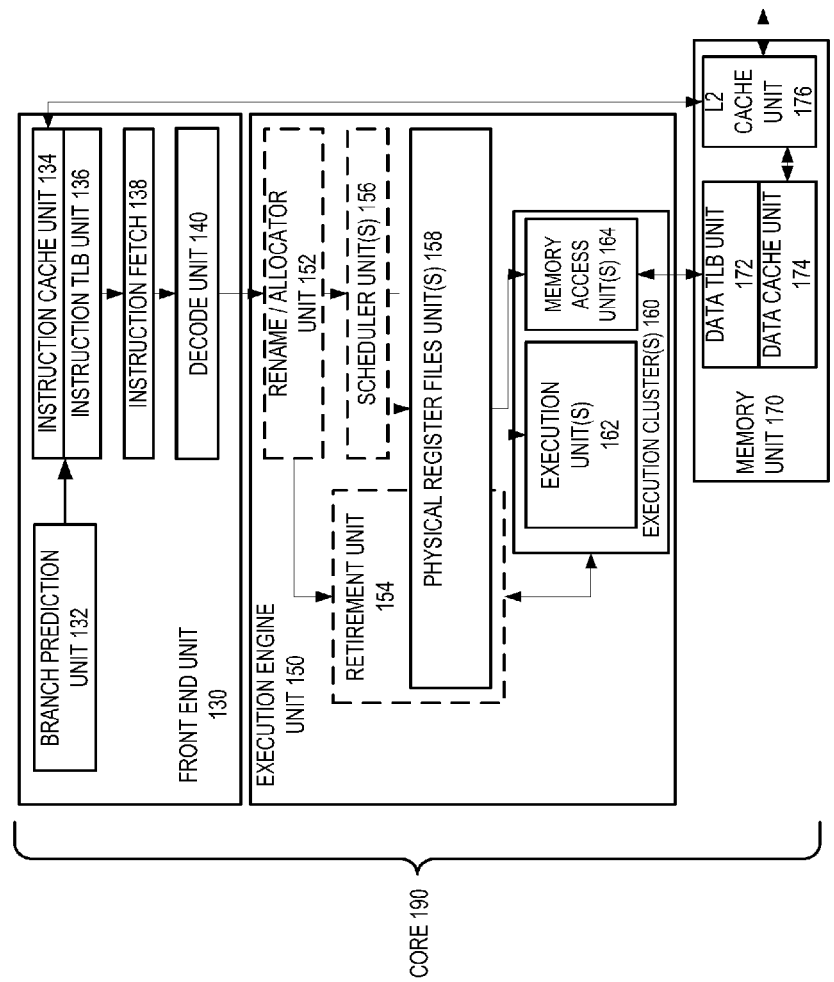
FIG. 1B is a block diagram illustrating both an exemplary embodiment of an in-order architecture core and an exemplary register renaming, out-of-order issue/execution architecture core to be included in a processor according to described embodiments.

FIG. 1A is a block diagram illustrating both an exemplary in-order pipeline and an exemplary register renaming, out-of-order issue/execution pipeline according to described embodiments. FIG. 1B is a block diagram illustrating both an exemplary embodiment of an in-order architecture core and an exemplary register renaming, out-of-order issue/execution architecture core to be included in a processor according to described embodiments. The solid lined boxes in FIG. 1A and FIG. 1B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) unit(s) 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit(s) 158 comprises a vector registers unit, a write mask registers unit, and a scalar registers unit. Such register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch unit 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 performs the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
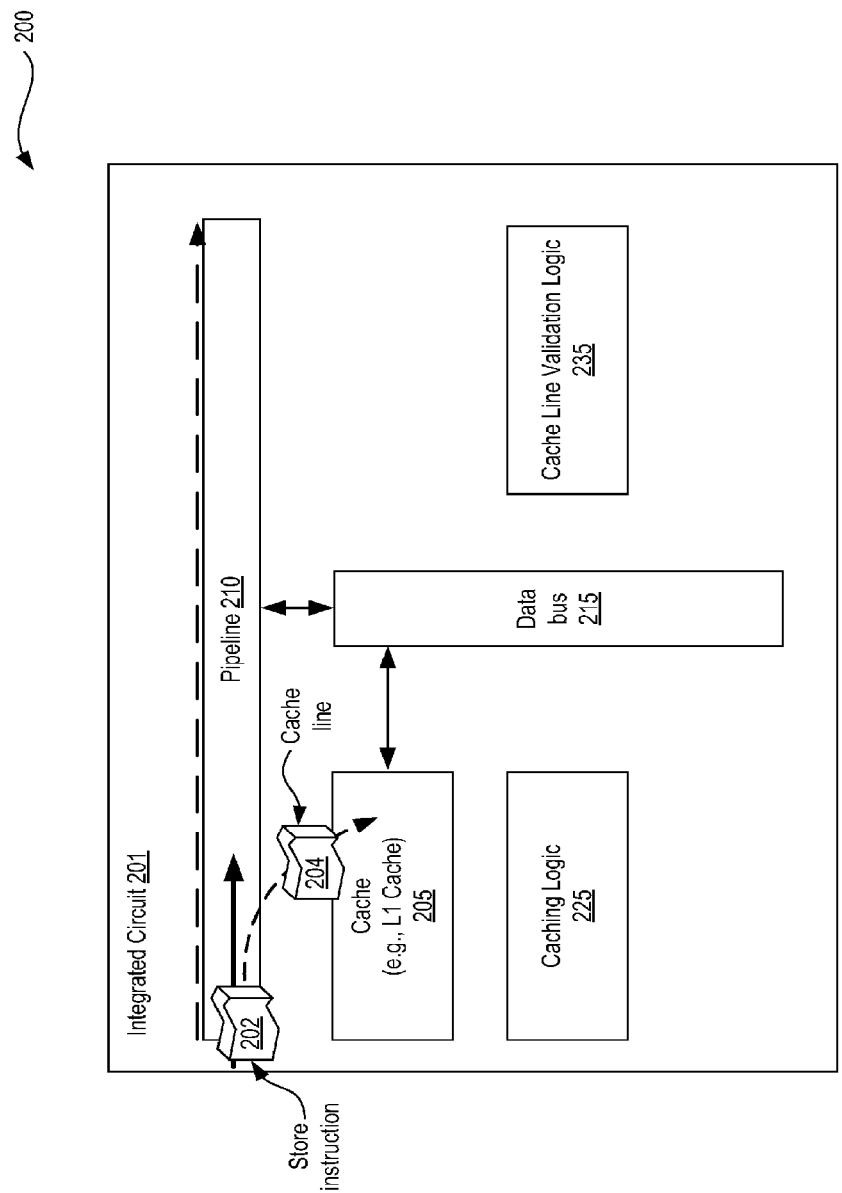
FIG. 2 illustrates an alternative exemplary architecture in accordance with which embodiments may operate.

FIG. 2 illustrates an alternative exemplary architecture 200 in accordance with which embodiments may operate. In particular, an integrated circuit 201 and its speculative cache write capability is depicted and described in additional detail.

In accordance with one embodiment, an integrated circuit 201 includes: a data bus 215; a cache 205 communicably interfaced with the data bus 215; and a pipeline 210 communicably interfaced with the data bus 215, in which the pipeline 210 is to receive a store instruction 202 corresponding to a cache line 204. In such an embodiment, the integrated circuit 201 further includes caching logic 225 to perform a speculative cache write of the cache line 204 into the cache 205 before the store instruction 202 retires from the pipeline 210 and also cache line validation logic 235 to determine if the cache line 204 written into the cache 205 is valid or invalid, in which the cache line validation logic 235 is to invalidate the cache line 204 speculatively written into the cache 205 when determined invalid and further in which the store instruction 202 is allowed to retire from the pipeline 210 when the cache line 204 is determined to be valid.

Once the store instruction retires from the pipeline, it is deemed to have been committed as it is now determined that the speculatively written information to cache is correct, and thus, no further action needs to be taken. Where the information is not correct, an affirmative invalidation operation must take place to invalidate the cache line in the cache as it does not have the correct information.

In one embodiment, the store instruction specifies a register with an address and the cache line to be written to cache is based on the address in the register.

In one embodiment, the integrated circuit 201 starts and completes during a two clock cycles of the integrated circuit 201 both: (a) receiving the store instruction 202 corresponding to the cache line 204; and (b) performing the speculative cache write of the cache line 204 into the cache 205. Thus, within two cycles, the pipeline 210 processes the receipt of the store instruction and completes the speculative cache write of the cache line 204 into the cache 205. In contrast, conventional mechanisms requiring a store buffer perform a store instruction which buffers to the store buffer and multiple cycles pass before the store instruction retires triggering the store buffer to write the data to the cache, during which time cache hits cannot read against the cache and must therefore engage complex circuitry to check for cached data within the store buffer, thus adding overhead and delay. Notably, the described cache line 204 is never processed through a store buffer and in accordance with the described embodiments, no such store buffer exists on the integrated circuit 201 to service the described cache 205, thus enabling the immediate availability of the cache line 204 at any subsequent cycle.

In accordance with one embodiment, the pipeline 210 further receives a read instruction to read the cache 205 and the integrated circuit 201 starts and completes during a single clock cycle of the integrated circuit 201 both: (a) receiving the read instruction for the cache line 204, and (b) fulfilling the read instruction by reading the cache line 204 from the cache 205. In such an embodiment, the single clock cycle of the integrated circuit 201 to read the cache line follows the two clock cycles of the integrated circuit 201 without any intervening clock cycles on the integrated circuit 201. Thus, operations which require a cache store (write) operation and immediately require a cache read operation can be completed by an implementing integrated circuit 201 in as few as three cycles of the integrated circuit.

In one embodiment, the cache 205 is a Level 1 cache (L1 cache) at a lowest hierarchal cache level for the integrated circuit 201. In one embodiment, the L1 cache implements a single cycle latency L1 cache. In one embodiment, the L1 cache is a 16 K (Kilobyte) 4-way set associative cache for a Central Processor Unit (CPU) embodied by the integrated circuit 201. In one embodiment, the cache 205 is a First Level Data (FLD) cache to implement very low latency single cycle processing without a complementary store buffer.

In accordance with one embodiment, the speculative cache write of the cache line 204 into the cache 205 includes writing the cache line 204 into the cache 205 before the store instruction 202 corresponding to the cache line 204 retires. Because the cache line 204 is written to the cache 205 before retirement, the cache line 204 cannot be determined valid at the time of the write, hence the write being a speculative cache write. It is possible that the store instruction will never retire, and thus, the cache line which is already written to cache will not contain correct information. Instead, the speculatively written cache line will require invalidation to ensure data integrity. Such a technique is therefore a compromise in an effort to provide an overall performance improvement and a reduction in complexity, power, and area of the integrated circuit 201 through the removal of the conventionally utilized store buffer. As described, the integrated circuit 201 allows store instructions 202 to write the First Level Data (FLD) cache before they retire and because a single-cycle First Level Data (FLD) cache is used, once the store instructions speculatively write to the cache 205, the written data (e.g., the cache line 204) is made available to reads and other stores with only a two-cycle latency or delay subsequent to the arrival of the store instruction 202. So as to maintain data integrity in the event speculative cache write mistakes occur, a cache invalidation mechanism is provided via the cache line validation logic 235 to invalidate any cache lines 204 that are written by store instructions which then fail to retire.

In accordance with one embodiment, the cache line validation logic 235 determining whether the cache line 204 written into the cache 205 is valid or invalid includes one of: (1) determining the cache line 204 is valid when the store instruction 202 retires from the pipeline; (2) determining the cache line 204 is invalid when the pipeline 210 is flushed before the store instruction 202 retires; (3) determining the cache line 204 is invalid when the pipeline 210 processes a late replay for the store instruction 202 corresponding to the cache line 204; and (4) determining the cache line 204 is invalid when the pipeline 210 processes a branch misprediction which causes a flush of the store instruction 202.

Branch mispredictions occur when a central processing unit (CPU) mispredicts (e.g., guesses wrong) what the next instruction is to be processed via its branch prediction mechanism which is used to speed up execution. During the execution of certain programs there are execution points where the program execution flow can continue in any one of several ways. Such points are called branches, or conditional jumps. The CPU uses the pipeline 210 to process several instructions at the same time, not all of which will necessarily be used or consumed. When the code for a conditional jump is read, the CPU does not yet know for certain what the next instruction to execute and insert into the execution pipeline 210.

Thus, branch prediction is used to permit such execution and instruction. The branch prediction mechanism guesses the next instruction to execute and inserts the next assumed instruction to the pipeline 210. Guessing wrong results in the branch misprediction and in accordance with the described embodiments, results in a speculatively written cache write requiring a subsequent cache line invalidation. The partially processed instructions in the pipeline 210 after the branch are then discarded and the pipeline 210 starts over at the correct branch when the branch misprediction is detected. This slows down the program execution and invalidating the speculatively written cache line 204 requires undesirable overhead because a later access to the invalidated cache line will miss the cache and thus potentially delay the pipeline. Nevertheless, because the large majority of speculative cache writes are correct, an overall performance gain is realized, despite the occasional cache line invalidation.

Figure 3:
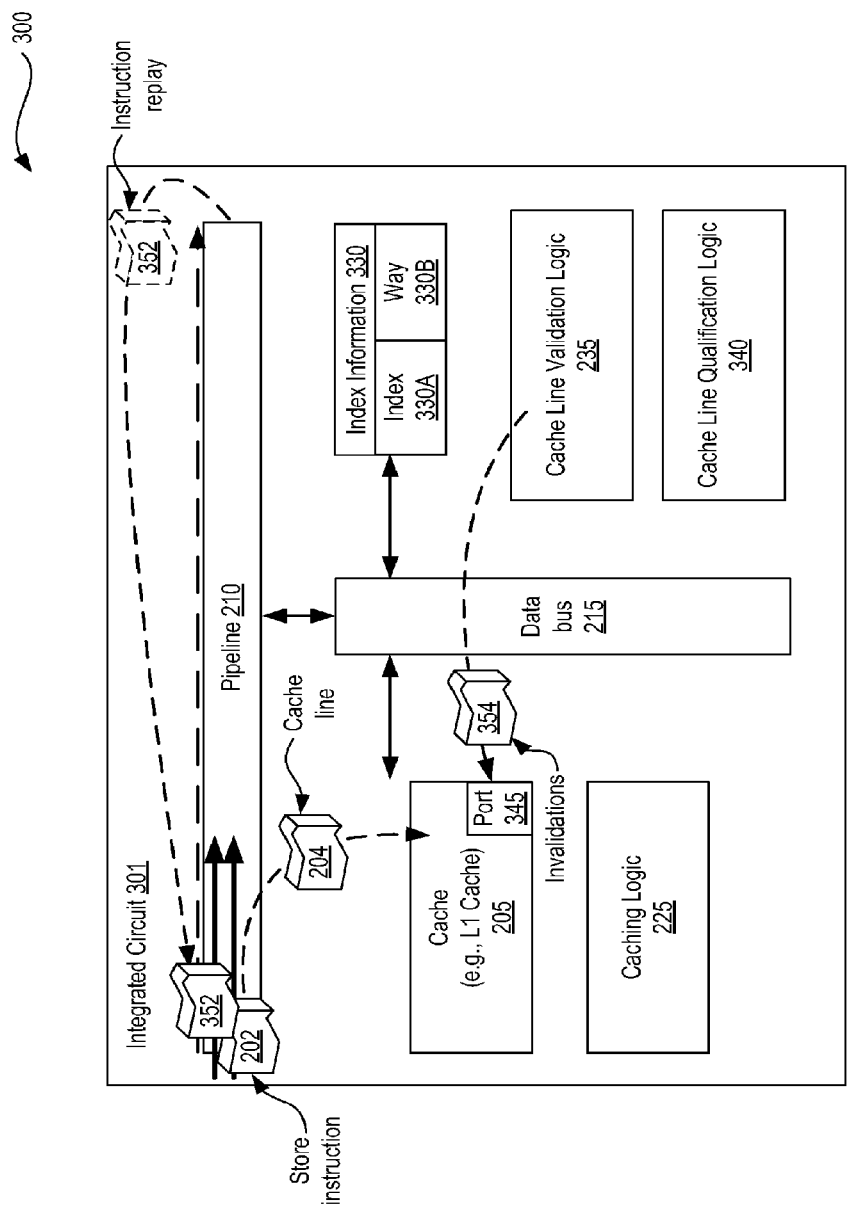
FIG. 3 illustrates another alternative exemplary architecture in accordance with which embodiments may operate.

FIG. 3 illustrates another alternative exemplary architecture 300 in accordance with which embodiments may operate. For example, an integrated circuit 301 is depicted in additional detail showing the cache line validation logic 235 causing an invalidation 354 through a port 345 of the cache 205, an instruction replay 352 is depicted, and cache line qualification logic 340 is additionally presented which utilizes index information 330 including index 330A and way 330B.

In one embodiment, the cache line validation logic 235 further maintains indexing information 330 for cache lines 204 written to the cache 205 via a speculative cache write. For example, in one embodiment the indexing information 330 maintains an index 330A and a way 330B on the cache 205 (e.g., which one of several sub-portions addressable as cache way) for each cache line 204 written to the cache 205 via a speculative cache write. Such information is only necessary for the purposes of subsequent invalidation in the event of a mistaken speculative cache write for a non-retiring store instruction. In the event speculatively written cache lines 204 must be invalidated, for example, as a result of a flush, the addressing information (e.g., 330A-B) provided by index information 330 is input back into the pipeline 210 and then applied to a port 345 that enables the cache line invalidation 354, thus resulting in a simple invalidation of all the cache lines 204 that were just written and are no longer applicable.

Thus, in accordance with one embodiment, integrated circuit 301 further includes a port 345 into the cache 205 in which the port 345 is capable to receive cache line 204 invalidations 354 as depicted. In one embodiment, the cache line validation logic 235 applies the indexing information 330 for a cache line 204 which has been determined to be invalid against the port 345 of the cache 205 to invalidate the cache line 204 in the cache 205.

If too many speculatively written cache lines 204 are invalidated then performance will suffer to an extent which is greater than using store buffers as is done with the above described conventional techniques. However, store instructions are late enough in the pipeline 210 that most events which trigger mistakes (e.g., improperly written cache lines which then require invalidation) are already known, and thus, many such store instructions can be preempted from speculatively writing their cache lines 204 to the cache. Thus, no such subsequent cache line invalidation is required and performance is not degraded. Instead, a performance gain is realized because not only is a cache line invalidation no longer required, but additionally, a temporary write to the store buffer is also negated as the described embodiments have done away with such a store buffer. In testing, it has been found that relatively few events are not caught; resulting in improper cache writes which require a subsequent invalidation of the cache line 204.

Thus, in accordance with one embodiment, the integrated circuit 301 further includes cache line qualification logic 340 to determine whether a cache line 204 corresponding to a store instruction 202 received at the pipeline 210 is to be written to the cache 205 via the speculative cache write or disqualified from being written to the cache 205 via the speculative cache write. In such an embodiment, the cache line qualification logic 340 is to disqualify the cache line 204 from being written to the cache 205 via the speculative cache write based on one or more of: (1) a pipeline 210 flush of the store instruction 202 before the speculative cache write of the cache line 204 to the cache 205; (2) a branch misprediction identified before the speculative cache write of the cache line 204 to the cache 205; (3) a replay 352 of an instruction in the pipeline 210 affecting the cache line 204 which is identified before the speculative cache write of the cache line 204 to the cache 205; and (4) the store instruction being predicated off causing the store instruction not to execute in the pipeline. Thus, depending on the disqualification events, a cache line corresponding to a store instruction may either be speculatively written to cache or disqualified from such a speculative write.

Various qualifiers and disqualifiers may be utilized by the cache line qualification logic 340 to permit or disqualify speculative cache writes into the cache 205. For example, the cache line qualification logic 340 may have a series of rules such as: (1) do not write if there is no corresponding store instruction 202; (2) do not write if a store instruction 202 is determined to be invalid; (3) do not write if the store is predicated off, and so forth. Then, the qualifications are referenced to determine whether a presently valid write exists for the present cycle. As an instruction progresses down the pipeline 210, more and more information is made available about whether such an instruction will trigger a flush or whether a replay for the instruction will occur. Circuitry of the integrated circuit 301 collects such information and applies it to the qualification rules so as to better predict cache invalidating events such as a future flush, a future confirmation of a misprediction, a future late replay, and so forth.

In one embodiment, circuitry of the integrated circuit implementing the speculative cache modification design is capable of determining when a speculative write of a cache line 204 to the cache 205 is unnecessary due to, for example, a pipeline 210 flush or late replay. For example, a late replay can cause all instructions in the pipeline 210 to cease and then replay from the beginning which by necessity invalidates all speculative writes to the cache 205. If a pipeline 210 flush or a late replay occurs, then all store instructions 202 resulting in a speculatively written cache line 204 must subsequently require invalidation 354 to be played back against the cache 205 to invalidate 354 the erroneous cache lines 204. However, it is in many circumstances knowable through the circuitry whether a pipeline 210 flush or a late replay and thus, such knowledge can be leveraged to completely preempt unnecessary a large portion of speculative cache writes to the cache through the cache line qualification logic 340 of the integrated circuit 301. If such information was not attainable in sufficient time for any of the store instructions, then excess overhead may result due to speculatively writing and subsequently invalidating numerous cache lines and generating wasteful overhead and system degradation.

For example, even where a late replay is encountered and the cache line qualification logic 340 prevents an associated store instruction 202 from speculatively writing its cache line 204, the respective instruction will come back down the pipeline 210 and will speculatively write at that time.

In accordance with one embodiment, the cache line validation logic 235 allows the store instruction to retire before subsequent instructions affecting the cache line 204 arrive at the pipeline 210. In most instances, there is a multi-cycle delay between a store instruction corresponding to a cache line 204 to be written to the cache and any subsequent instructions which require or act upon data associated with such a cache line 204, and thus, no special action is required to ensure that speculatively written cache lines are determined to be valid or appropriately invalidated before subsequent instructions affecting the cache line arrive.

However, some special instructions may arrive too quickly, and thus, require special attention. Accordingly, in one embodiment, allowing the store instruction to retire before subsequent instructions affecting the cache line 204 arrive at the pipeline 210 includes detecting a snoop and responsively causing a replay 352 of subsequent instructions. Any snoop may cause a potential structural hazard between the snoops and invalidations of cache lines because both make use of the same cache ports, thus creating a potential contention issue for the port. Snoops may be given higher priority than invalidations thus requiring the invalidations to wait. The invalidations may in turn be given higher priority than the subsequent instructions, and thus, the subsequent instructions are replayed until the invalidations finish.

In one embodiment, the cache 205 includes a write through First Level Data (FLD) cache for a first core on the integrated circuit 301 which is prohibited from storing dirty data and prohibited from operating as a source cache to other processor cores on the integrated circuit 301. Further in accordance with such an embodiment, a next level of cache on the integrated circuit 301 operates as the source cache to other processor cores on the integrated circuit 301.

Timing of cache writes are controlled by what is known as a write policy in which there are two basic writing approaches: write-through and write-back. A write-through cache policy causes writes to be done synchronously both to the cache 205 and to the next level of cache. A write-back (or write-behind) cache policy writes only to the cache 205 and a modified cache block is written back to the next level of cache, just before it is replaced. Write-back locations that are written over must be marked as dirty for later writing to the backing underlying non-cache memory store. The data in such locations are written back to the next level of cache only when they are evicted from the cache 205 resulting in what is commonly referred to as a lazy write.

In accordance with the described embodiments, the cache 205 operating as a write through First Level Data (FLD) cache cannot ever contain dirty data because: (1) it synchronously updates the next level of cache and (2) the write through First Level Data (FLD) cache delegates caching requests from other cores to the next level of cache in accordance with such an embodiment, and thus, there is no risk that a speculatively written but not yet determined valid cache line can be read or forwarded to another processor core.

Figure 4:
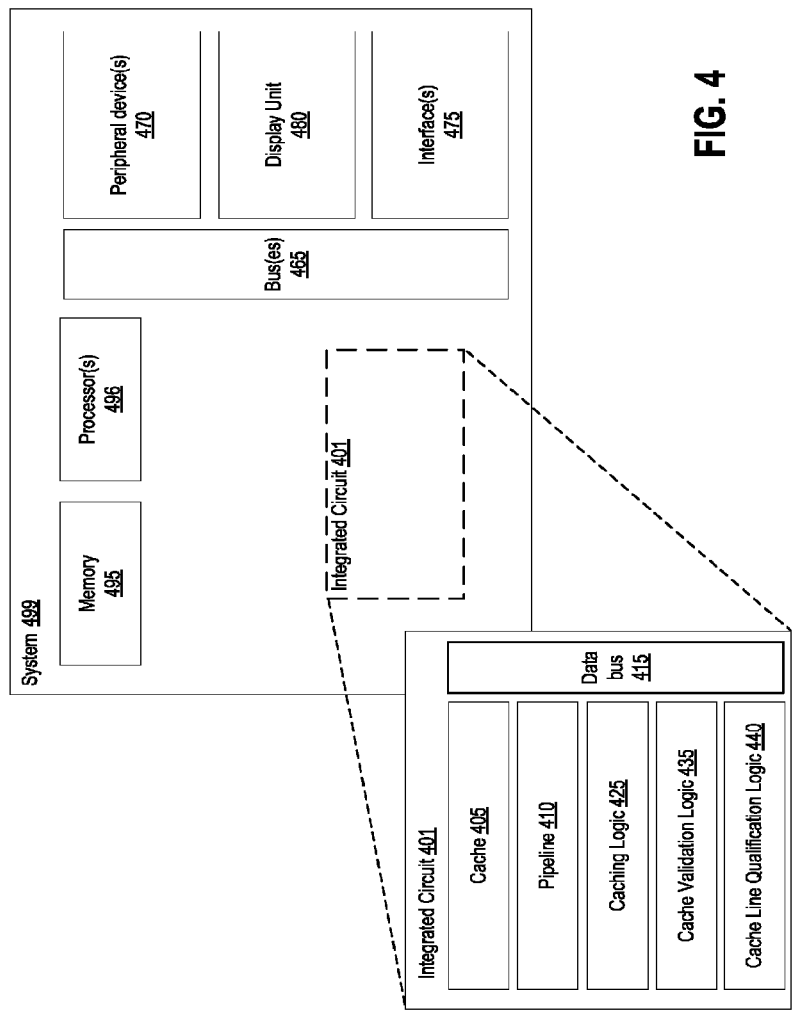
FIG. 4 shows a diagrammatic representation of a system in accordance with which embodiments may operate, be installed, integrated, or configured.

FIG. 4 shows a diagrammatic representation of a system 499 in accordance with which embodiments may operate, be installed, integrated, or configured.

In one embodiment, system 499 includes a memory 495 and a processor or processors 496. For example, memory 495 may store instructions to be executed and processor(s) 496 may execute such instructions. System 499 includes communication bus(es) 465 to transfer transactions, instructions, requests, and data within system 499 among a plurality of peripheral device(s) 470 communicably interfaced with one or more communication buses 465 and/or interface(s) 475. Display unit 480 is additionally depicted within system 499.

Distinct within system 499 is integrated circuit 401 which may be installed and configured in a compatible system 499, or manufactured and provided separately so as to operate in conjunction with appropriate components of system 499.

In accordance with one embodiment, system 499 includes at least a display unit 480 and an integrated circuit 401. The integrated circuit 401 may operate as, for example, a processor or as another computing component of system 499. In such an embodiment, the integrated circuit 401 of system 499 includes at least: a data bus 415; a cache 405 communicably interfaced with the data bus 415; a pipeline 410 communicably interfaced with the data bus 415, in which the pipeline 410 is to receive a store instruction corresponding to a cache line to be written to cache; caching logic 425 to perform a speculative cache write of the cache line into the cache 405 before the store instruction retires from the pipeline 410; and cache line validation logic 435 to determine if the cache line written into the cache 405 is valid or invalid, in which the cache line validation logic 435 is to invalidate the cache line speculatively written into the cache 405 when the cache line is determined to be invalid and further in which the store instruction is allowed to retire from the pipeline 410 when the cache line is determined to be valid.

In one embodiment, system 499 embodies a tablet or a smartphone and the display unit 480 is a touchscreen interface for the tablet or the smartphone. In such an embodiment, the integrated circuit 401 is incorporated into the tablet or smartphone, for example, as a processor or other computing component for the tablet or smartphone.

In one embodiment, the system 499 further includes cache line qualification logic 440 to determine whether a cache line corresponding to a store instruction received at the pipeline 410 is to be written to the cache via the speculative cache write or disqualified from being written to the cache via the speculative cache write.

Figure 5:
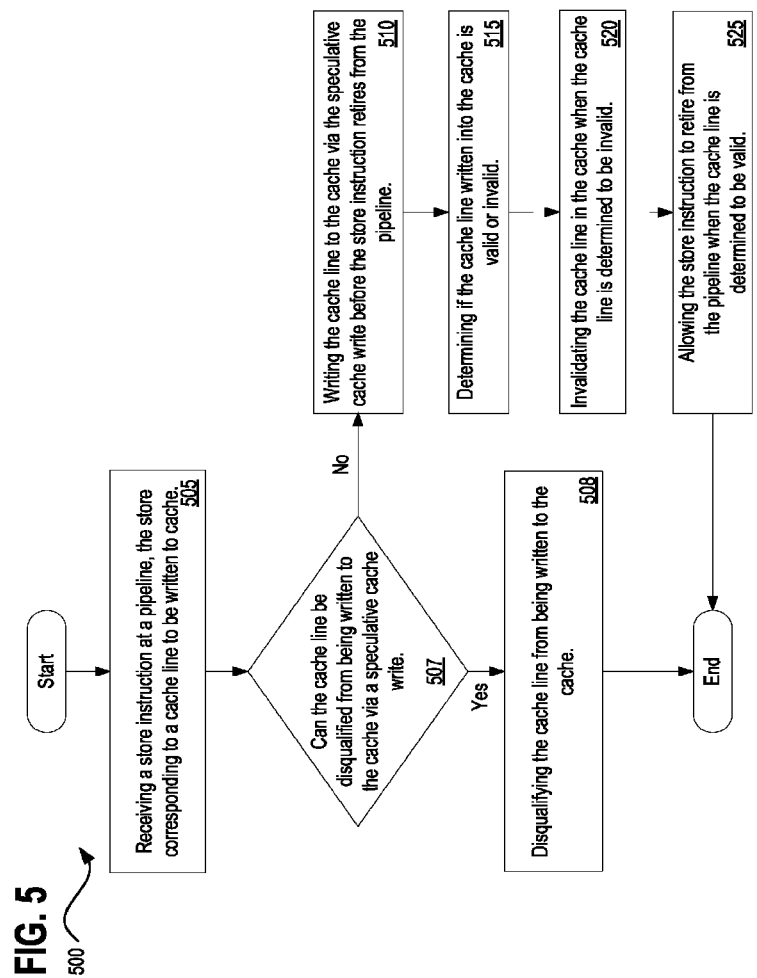
FIG. 5 is a flow diagram illustrating a method for implementing a speculative cache modification design in accordance with described embodiments.

FIG. 5 is a flow diagram illustrating a method for implementing a speculative cache modification design in accordance with described embodiments. Method 500 may be performed by processing logic that may include hardware (e.g., circuitry, dedicated logic, programmable logic, microcode, etc.). The numbering of the blocks presented is for the sake of clarity and is not intended to prescribe an order of operations in which the various blocks must occur.

Method 500 begins with processing logic for receiving a store instruction at a pipeline, in which the store instruction corresponds to a cache line to be written to cache (block 505).

At decision point 507, processing logic determines whether the cache line can be disqualified from being written to the cache via a speculative cache write. If "yes," then processing proceeds to block 508 and processing logic disqualifies the cache line from being written to the cache.

Conversely, if "no," a disqualification cannot be made, then processing proceeds to block 510 and processing logic writes the cache line to the cache via the speculative cache write before the store instruction retires from the pipeline.

At block 515, processing logic determines if the cache line written into the cache is valid or invalid.

At block 520, processing logic invalidates the cache line in the cache when the cache line is determined to be invalid.

At block 525, processing logic allows the store instruction to retire from the pipeline when the cache line is determined to be valid.

Figure 6:
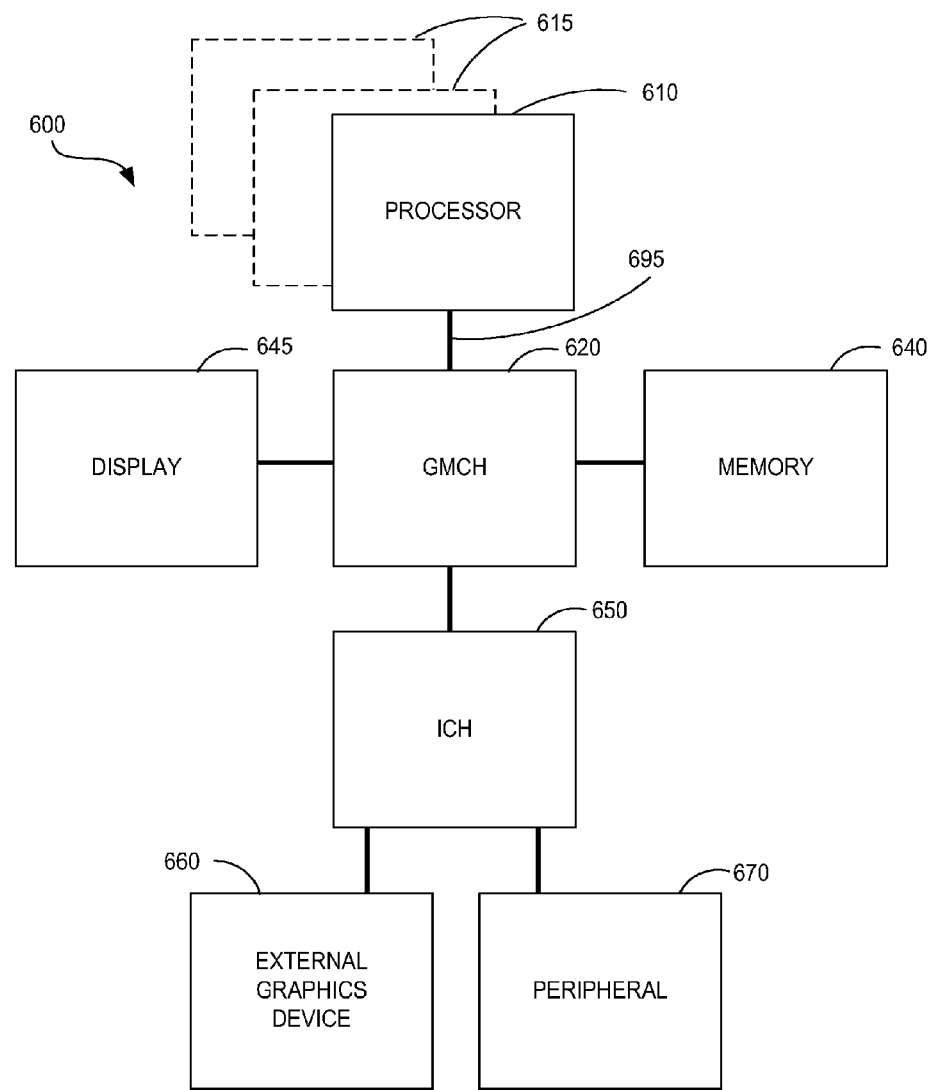
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
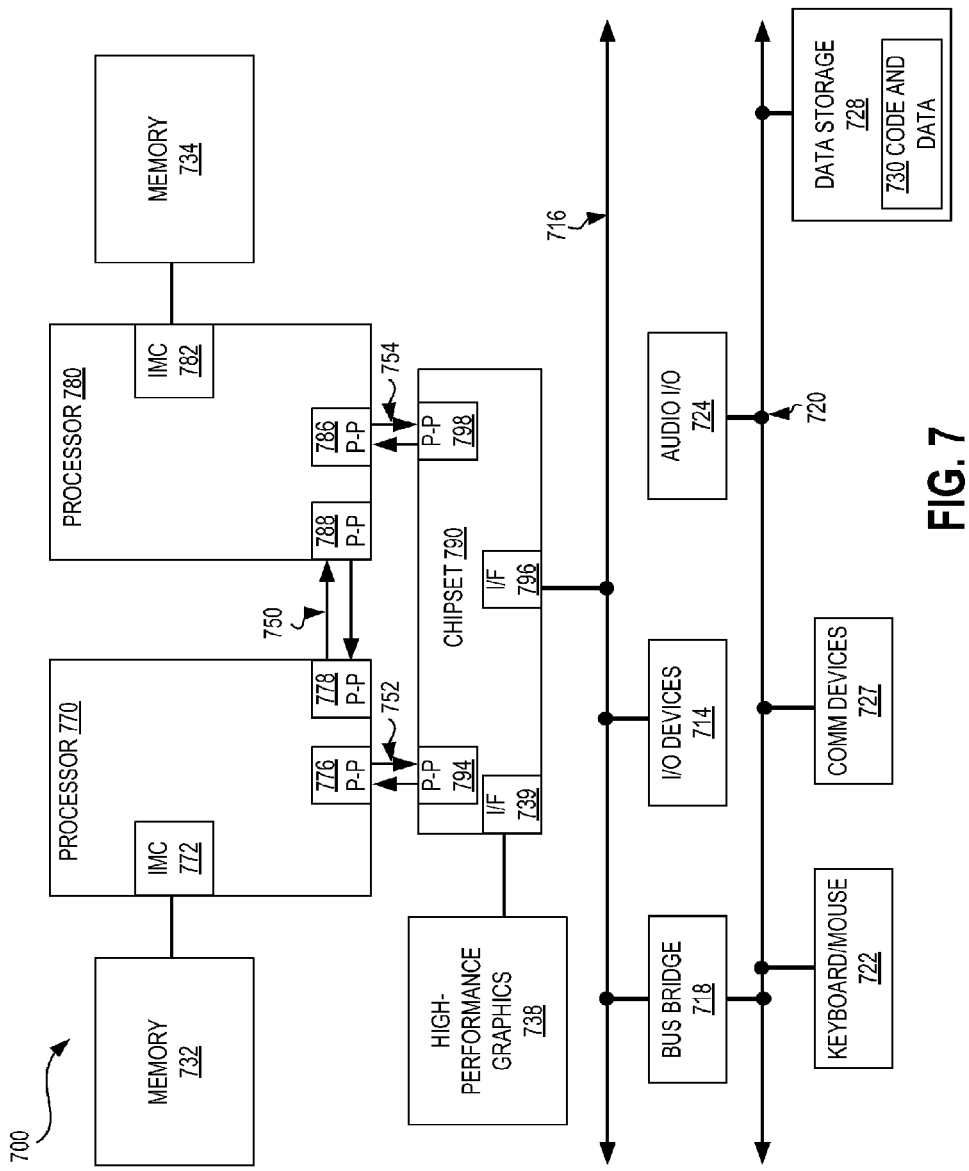
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interface 750. Each of processors 770 and 780 may be some version of the processors or integrated circuits as previously described or as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
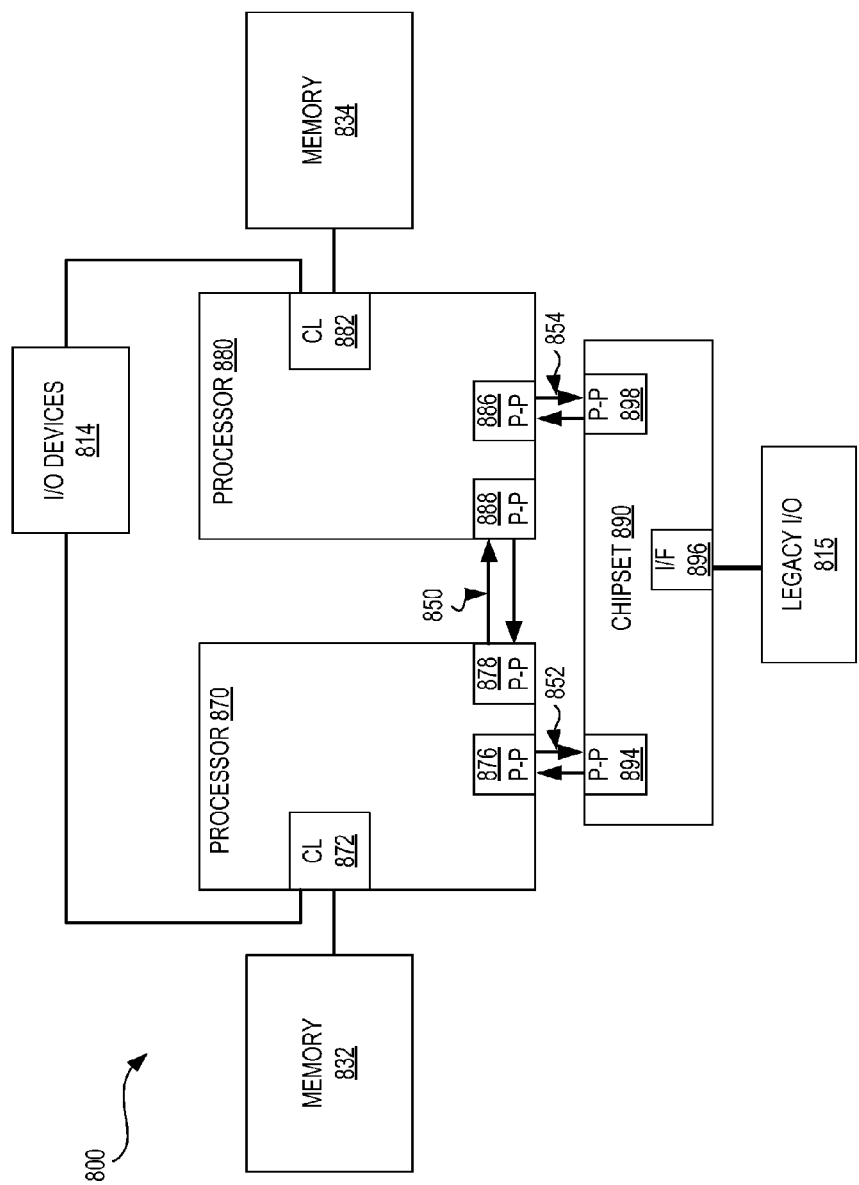
FIG. 8 is a block diagram of a computer system according to one embodiment.

Referring now to FIG. 8, shown is a block diagram of a system 800 in accordance with an embodiment of the present invention. FIG. 8 illustrates that the processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
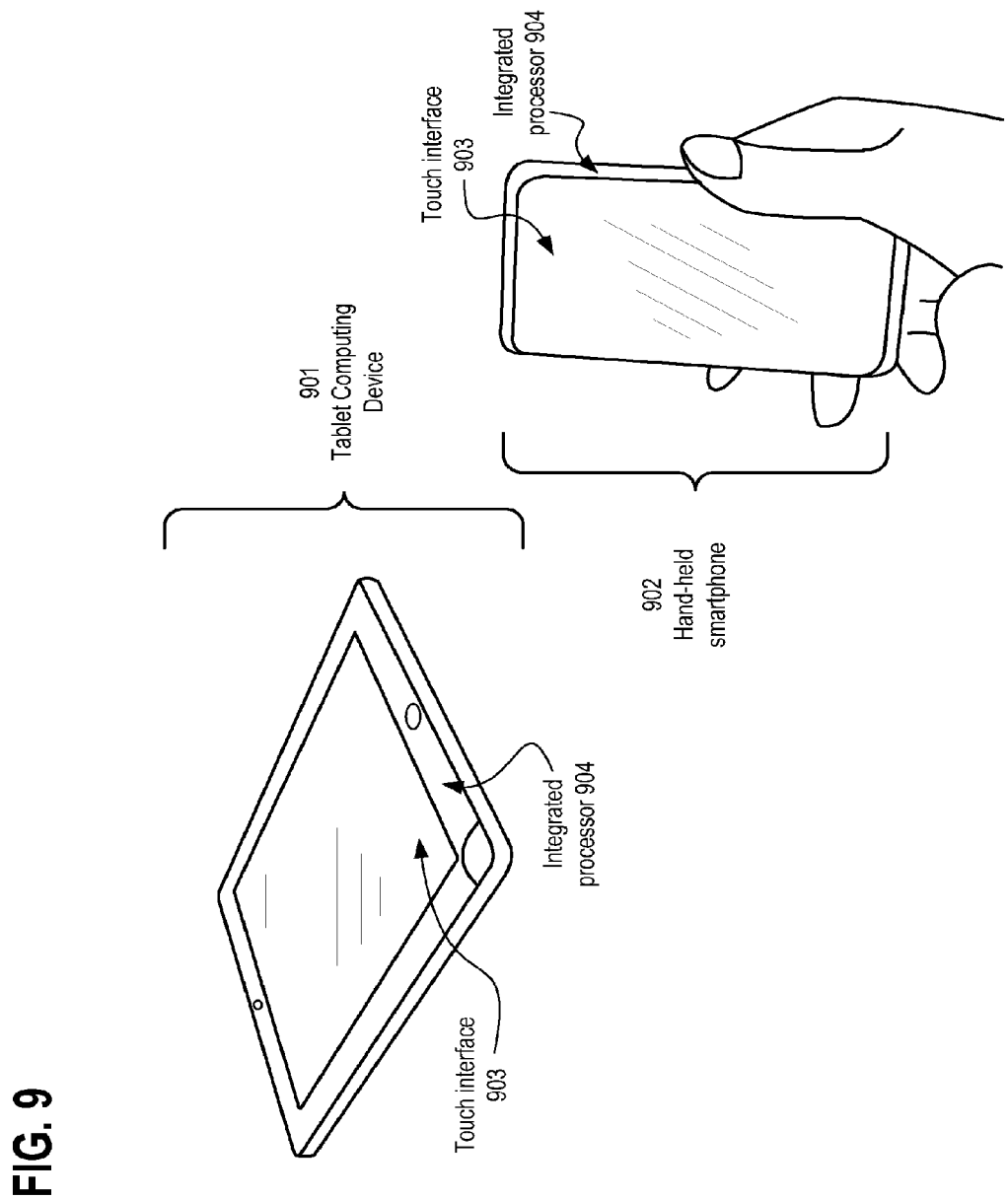
FIG. 9 depicts a tablet computing device and a hand-held smartphone each having a circuitry integrated therein as described in accordance with the embodiments.

FIG. 9 depicts a tablet computing device 901 and a handheld smartphone 902 each having a circuitry integrated therein as described in accordance with the embodiments. As depicted, each of the tablet computing device 901 and the hand-held smartphone 902 include a touchscreen interface 903 and an integrated processor 904 in accordance with disclosed embodiments.

For example, in one embodiment, a system embodies a tablet computing device 901 or a hand-held smartphone 902, in which a display unit of the system includes a touchscreen interface 903 for the tablet or the smartphone and further in which memory and an integrated circuit operating as an integrated processor are incorporated into the tablet or smartphone, in which the integrated processor implements one or more of the embodiments described herein for implementing a speculative cache modification design. In one embodiment, the integrated circuit described above or the depicted integrated processor of the tablet or smartphone is an integrated silicon processor functioning as a central processing unit for a tablet computing device or a smartphone.

For example, in accordance with one embodiment, a tablet computing device includes a display unit and an integrated circuit; and in such an embodiment, the integrated circuit includes a data bus; a cache communicably interfaced with the data bus; a pipeline communicably interfaced with the data bus, in which the pipeline is to receive a store instruction corresponding to a cache line to be written to cache; caching logic to perform a speculative cache write of the cache line into the cache before the store instruction retires from the pipeline; and cache line validation logic to determine if the cache line written into the cache is valid or invalid, in which the cache line validation logic is to invalidate the cache line speculatively written into the cache when determined invalid and further in which the store instruction is allowed to retire from the pipeline when the cache line is determined to be valid.

Figure 10:
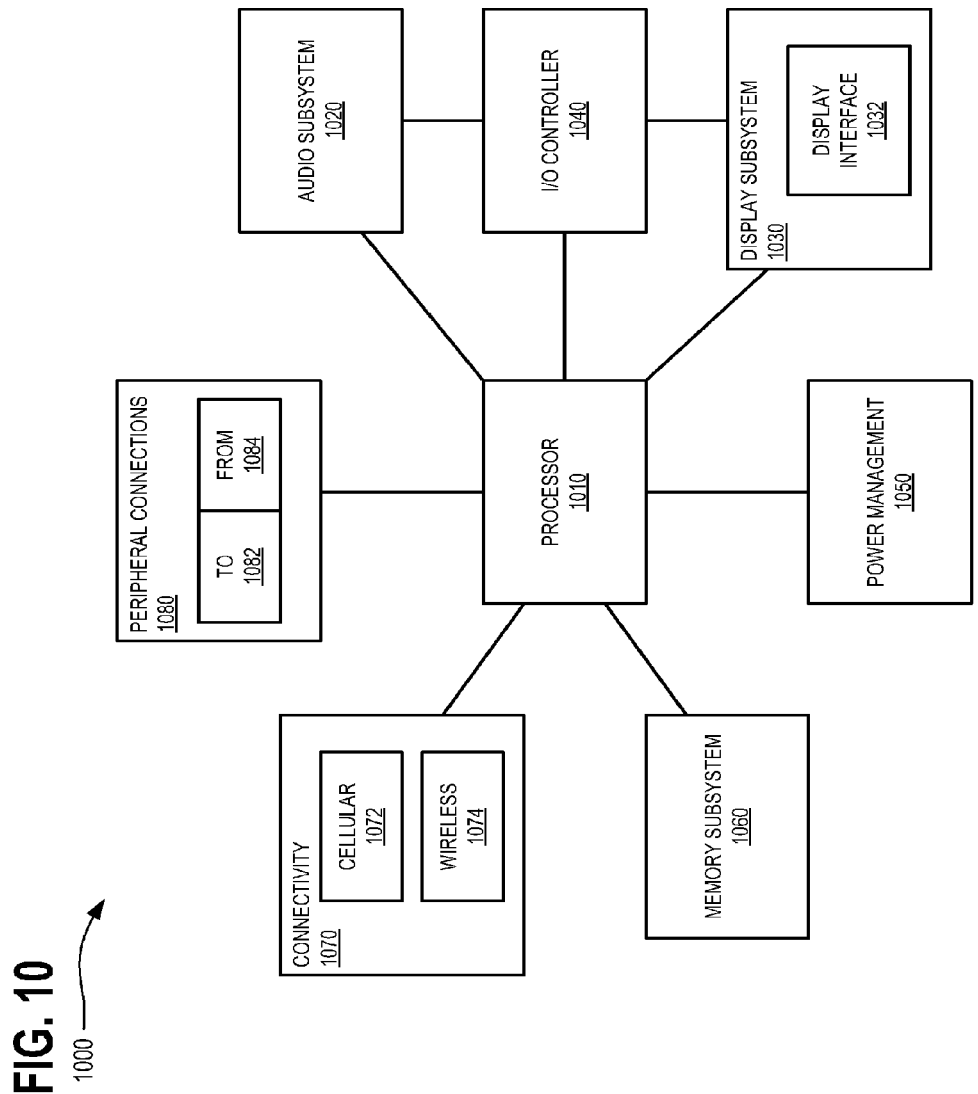
FIG. 10 is a block diagram of an embodiment of tablet computing device, a smartphone, or other mobile device in which touchscreen interface connectors are used.

FIG. 10 is a block diagram 1000 of an embodiment of tablet computing device, a smartphone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1010.

Display subsystem 1030 represents hardware (e.g., display devices) and software (e.g., drivers) components that provide a visual and/or tactile display for a user to interact with the tablet computing device or smartphone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smartphone through which a user might interact. In one embodiment, I/O controller 1040 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1050 that manages battery power usage, charging of the battery, and features related to power saving operation. Memory subsystem 1060 includes memory devices for storing information in the tablet computing device or smartphone. Connectivity 1070 includes hardware devices (e.g., wireless and/or wired connectors and communication hardware) and software components (e.g., drivers, protocol stacks) to the tablet computing device or smartphone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smartphone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
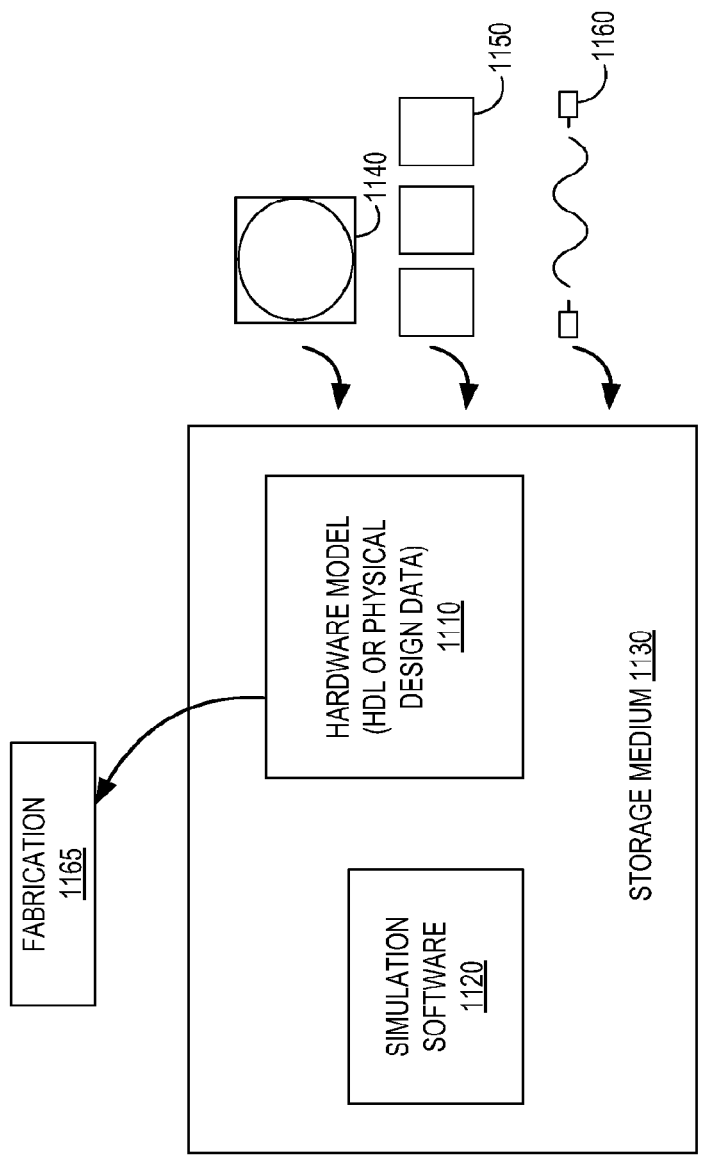
FIG. 11 is a block diagram of an IP core development system according to one embodiment.

FIG. 11 shows a block diagram illustrating the development of IP cores according to one embodiment. Storage medium 1130 includes simulation software 1120 and/or hardware or software model 1110. In one embodiment, the data representing the IP core design can be provided to the storage medium 1130 via memory 1140 (e.g., hard disk), wired connection (e.g., internet) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
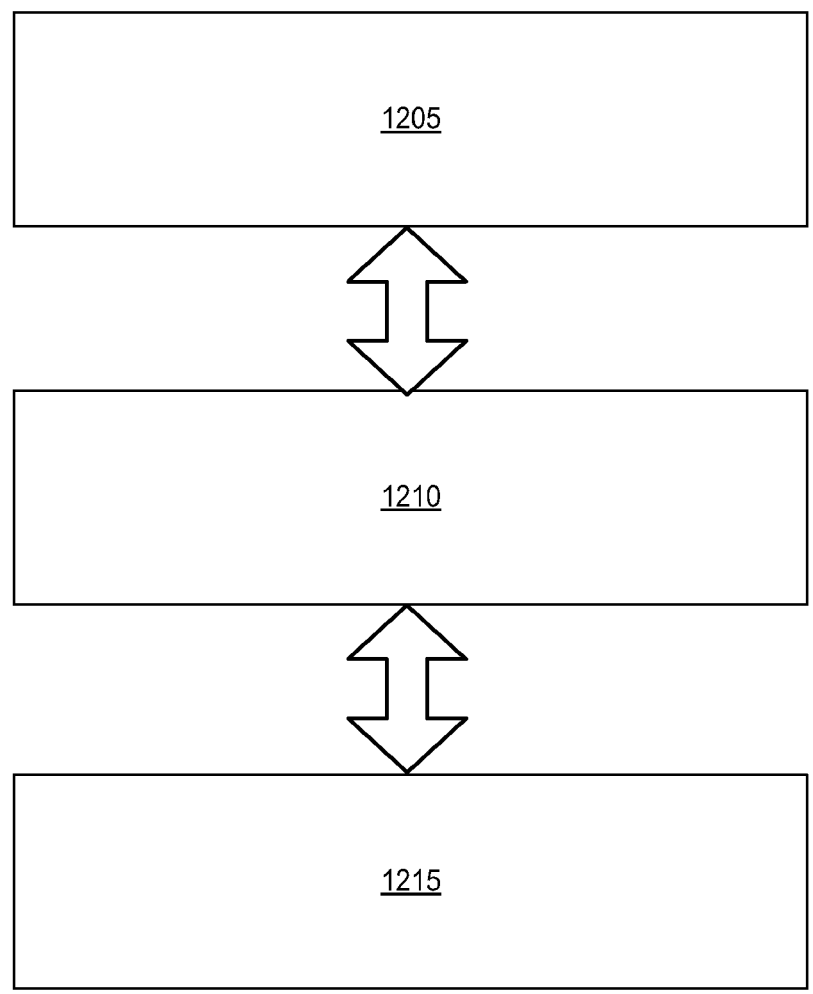
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to execute natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without at least one x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. An integrated circuit comprising:
   a data bus;
   a cache communicably interfaced with the data bus;
   a pipeline communicably interfaced with the data bus, the pipeline to receive a store instruction corresponding to a cache line to be written to cache;
   caching logic to perform a speculative cache write of the cache line into the cache before the store instruction retires from the pipeline; and
   cache line validation logic to determine if the cache line written into the cache is valid or invalid, wherein the cache line validation logic to invalidate the cache line speculatively written into the cache when determined invalid and wherein the store instruction is allowed to retire from the pipeline when the cache line is determined valid.

2. The integrated circuit of claim 1, wherein the integrated circuit comprises a central processing unit for one of a tablet computing device or a smartphone.

3. The integrated circuit of claim 1:
   wherein the store instruction corresponding to the cache line to be written to cache comprises the store instruction to specify a register with an address; and
   wherein the cache line to be written to cache is based on the address in the register.

4. The integrated circuit of claim 1, wherein the integrated circuit to start and complete during two clock cycles of the integrated circuit both:
   (a) receiving the store instruction corresponding to the cache line; and
   (b) performing the speculative cache write of the cache line into the cache.

5. The integrated circuit of claim 4:
   wherein the pipeline to further receive a read instruction to read the cache line from the cache;
   wherein the integrated circuit to start and complete during a single clock cycle of the integrated circuit both:
   (a) receiving the read instruction for the cache line, and
   (b) fulfilling the read instruction by reading the cache line from the cache; and
   wherein the single clock cycle of the integrated circuit follows the two clock cycles of the integrated circuit without any intervening clock cycles on the integrated circuit.

6. The integrated circuit of claim 1, wherein the cache comprises a Level 1 cache (L1 cache) at a lowest hierarchal cache level for the integrated circuit.

7. The integrated circuit of claim 6, wherein the L1 cache comprises a single cycle latency L1 cache.

8. The integrated circuit of claim 6, wherein the L1 cache comprises a 16 K (Kilobyte) 4-way set associative cache for a Central Processor Unit (CPU) embodied by the integrated circuit.

9. The integrated circuit of claim 1, wherein the cache line validation logic to determine if the cache line written into the cache is valid or invalid comprises one of:
   determining the cache line is valid when the store instruction retires from the pipeline;
   determining the cache line is invalid when the pipeline is flushed before the store instruction retires;
   determining the cache line is invalid when the pipeline processes a late replay for the store instruction corresponding to the cache line; and
   determining the cache line is invalid when the pipeline processes a branch misprediction which causes a flush of the store instruction.

10. The integrated circuit of claim 1, wherein the cache line validation logic further maintains indexing information for cache lines written to the cache via a speculative cache write.

11. The integrated circuit of claim 10, wherein the indexing information maintains an index and a way for each cache line written to the cache via a speculative cache write.

12. The integrated circuit of claim 10, further comprising:
   a port to the cache capable to receive cache line invalidations; and
   wherein the cache line validation logic to invalidate the cache line comprises the cache line validation logic to apply the indexing information for the cache line determined invalid against the port of the cache to invalidate the cache line in the cache.

13. The integrated circuit of claim 1, further comprising cache line qualification logic to determine whether a second cache line corresponding to a second store instruction received at the pipeline is to be written to the cache via the speculative cache write or disqualified from being written to the cache via the speculative cache write.

14. The integrated circuit of claim 13, wherein the cache line qualification logic to disqualify the second cache line from being written to the cache via the speculative cache write based on one or more of:
a pipeline flush of the second store instruction before the speculative cache write of the second cache line to the cache;
a branch misprediction involving a branch which includes the second store instruction;
a replay of the second store instruction corresponding to the second cache line; and
the second store instruction being predicated off causing the store instruction not to execute in the pipeline.

15. The integrated circuit of claim 1, wherein the cache line validation logic to allow the store instruction to retire from the pipeline when the cache line is determined valid comprises retiring the cache line before subsequent instructions affecting the cache line arrive at the pipeline.

16. The integrated circuit of claim 15, wherein retiring the cache line before subsequent instructions affecting the cache line arrive at the pipeline comprises:
detecting a snoop in the pipeline and responsively causing a replay of subsequent instructions.

17. The integrated circuit of claim 1:
wherein the cache comprises a write through First Level Data (FLD) cache for a first core on the integrated circuit which is prohibited from storing dirty data and prohibited from operating as a source cache to other processor cores on the integrated circuit; and
wherein next level of cache on the integrated circuit operates as the source cache to other processor cores on the integrated circuit.

18. A system comprising:
a display unit; and
an integrated circuit, wherein the integrated circuit comprises:
a data bus,
a cache communicably interfaced with the data bus;
a pipeline communicably interfaced with the data bus, the pipeline to receive a store instruction corresponding to a cache line to be written to cache,
caching logic to perform a speculative cache write of the cache line into the cache before the store instruction retires from the pipeline, and
cache line validation logic to determine if the cache line written into the cache is valid or invalid, wherein the cache line validation logic to invalidate the cache line speculatively written into the cache when determined invalid and wherein the store instruction is allowed to retire from the pipeline when the cache line is determined valid.

19. The system of claim 18:
wherein the system embodies a tablet or a smartphone;
wherein the display unit comprises a touchscreen interface of the tablet or the smartphone; and
wherein the integrated circuit is incorporated into the tablet or smartphone.

20. The system of claim 18, further comprising cache line qualification logic to determine whether a second cache line corresponding to a second store instruction received at the pipeline is to be written to the cache via the speculative cache write or disqualified from being written to the cache via the speculative cache write.

21. A tablet computing device comprising:
a display unit; and
an integrated circuit, wherein the integrated circuit comprises:
a data bus,
a cache communicably interfaced with the data bus;
a pipeline communicably interfaced with the data bus, the pipeline to receive a store instruction corresponding to a cache line to be written to cache,
caching logic to perform a speculative cache write of the cache line into the cache before the store instruction retires from the pipeline, and
cache line validation logic to determine if the cache line written into the cache is valid or invalid, wherein the cache line validation logic to invalidate the cache line speculatively written into the cache when determined invalid and wherein the store instruction is allowed to retire from the pipeline when the cache line is determined valid.

22. A method in an integrated circuit, the method comprising:
receiving a store instruction at a pipeline of the integrated circuit, the store instruction corresponding to a cache line to be written to a cache;
writing the cache line to the cache of the integrated circuit via a speculative cache write before the store instruction retires from the pipeline;
determining if the cache line speculatively written into the cache is valid or invalid;
invalidating the cache line in the cache when the cache line is determined to be invalid; and
allowing the store instruction to retire from the pipeline when the cache line is determined to be valid.

23. The method of claim 22, wherein determining if the cache line written into the cache is valid or invalid comprises one of:
determining the cache line is valid when the store instruction retires from the pipeline;
determining the cache line is invalid when the pipeline is flushed before the store instruction retires;
determining the cache line is invalid when the pipeline processes a late replay for the store instruction corresponding to the cache line; and
determining the cache line is invalid when the pipeline processes a branch misprediction which causes a flush of the store instruction.

24. The method of claim 22, further comprising:
receiving a second store instruction at the pipeline of the integrated circuit, the second store instruction corresponding to a second cache line; and
determining whether the second cache line is to be written to the cache via the speculative cache write or disqualified from being written to the cache via the speculative cache write.

25. The method of claim 24, wherein determining the second cache line is to be disqualified comprises disqualifying the second cache line from being written to the cache via the speculative cache write based on one or more of:
a pipeline flush of the second store instruction before the speculative cache write of the second cache line to the cache;

a branch misprediction which causes a flush of the store instruction;

a replay of the second store instruction corresponding to the second cache line; and the second store instruction being predicated off causing the store instruction not to execute in the pipeline.

\* \* \* \* \*